(12) United States Patent
Viaud et al.

(10) Patent No.: US 8,656,831 B2
(45) Date of Patent: Feb. 25, 2014

(54) ROUND BALER

(75) Inventors: Jean Viaud, Reyssouze (FR); Mickael Cocardon, Beauvais (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/842,402

(22) Filed: Jul. 23, 2010

(65) Prior Publication Data

US 2011/0174171 A1 Jul. 21, 2011

(30) Foreign Application Priority Data

Aug. 3, 2009 (EP) .................................... 09167050

(51) Int. Cl.
*A01F 15/07* (2006.01)
*A01F 15/08* (2006.01)

(52) U.S. Cl.
CPC ........... *A01F 15/0705* (2013.01); *A01F 15/085* (2013.01)
USPC .......................................................... 100/88

(58) Field of Classification Search
USPC .................. 100/87, 88, 89; 56/341
See application file for complete search history.

(56) References Cited

U.S. PATENT DOCUMENTS

| | | | | |
|---|---|---|---|---|
| 4,057,954 A | * | 11/1977 | Mast | 56/341 |
| 4,510,861 A | * | 4/1985 | Campbell et al. | 100/88 |
| 4,514,969 A | * | 5/1985 | Moosbrucker et al. | 56/341 |
| 4,534,285 A | * | 8/1985 | Underhill | 100/88 |
| 4,580,398 A | * | 4/1986 | Bruer et al. | 56/341 |
| 4,625,502 A | * | 12/1986 | Gerhardt et al. | 56/341 |
| 4,667,592 A | * | 5/1987 | Pentith et al. | 100/88 |
| 4,914,900 A | * | 4/1990 | Viaud | 56/341 |

FOREIGN PATENT DOCUMENTS

| | | |
|---|---|---|
| EP | 1264532 | 12/2002 |
| EP | 1836890 | 9/2007 |

* cited by examiner

*Primary Examiner* — Jimmy T Nguyen
(74) *Attorney, Agent, or Firm* — Quarles & Brady LLP (57) ABSTRACT

A round baler of the non-stop type has three arms rotating about a common axis and having rolls at their free ends. A loop may be formed between rolls of adjacent arms, wherein material is fed to the loop forming a bale from one of several outlets fed by a feeder.

8 Claims, 9 Drawing Sheets

Fig. 9 under an acute angle to the surface of the bale forming means to facilitate the bale starting.

ROUND BALER

FIELD OF THE INVENTION

This invention relates to a round baler having endless bale forming means routed over at least one roll on each of three or more arms rotating about one or more axes, whereas rolls of adjacent arms leave a distance between each other bridged by a span of the bale forming means, against which span material to be baled is pressed by a feeder.

BACKGROUND OF THE INVENTION

European Patent Document EP 1 264 532 A1 discloses a round baler of the non-stop type, which has three arms rotating about a common axis and having rolls at their free ends. A loop is formed between rolls of adjacent arms by crop coming from a pick-up. Either a feeder moves a bale along the baler and returns to a start position or it hands over the started bale to a second conveyor.

European Patent Document EP 1 836 890 shows another non-stop round baler with three arms, which are journaled for a pivoting movement on three different axles. Loops are created by incoming crop in flexible bale forming means in the area between adjacent rolls on said arms.

The problem to be solved with respect to this prior art is seen in either the difficulty to return the pick-up fast enough to the start position and/or in the complex and expensive designs.

SUMMARY OF THE INVENTION

Having a varying outlet helps to leave the feeder in place and deliver the material, where the entry for the auxiliary bale chamber currently is located. Delivering the material to be baled at various locations could mean having one duct, which is flexible and can follow the moving auxiliary bale chamber; this can be achieved by several overlapping wall sections and a respective carrier and control. Various locations could also have several independent outlets, which are chosen as need be.

Various locations could have one big outlet opening, which is partially closed and opened, depending on where the auxiliary bale chamber finds itself. Feeding to the loop may happen through a duct, and/or also along walls, deflectors, etc. which are adjusted in their position; rolls may also mean wheels.

Using several outlets together with multiple conveyors to feed them helps to avoid long feeding paths and allows the design of a feeder and its conveyors such, that they can perform the functions needed. For example, one conveyor may be used as a cutter, whereas another conveyor is for transport only. Another conveyor may be used as a conditioner for the goods to be baled, like grass or straw. The term conveyor should be understood as a general term for a tangential, radial or axial conveyor acting continuously. This could also be a chain, band or similar means revolving about shafts.

In case several conveyors of the feeder are located close to each other, one conveyor may use the outlet of the other without enlarging the feed path; depending on the function of the conveyor, material to be baled may selectively be forwarded to the other conveyor for processing or conditioning before being baled.

In order to provide for a good bale core start, the initial bale chamber may be kept small by providing one or more covers for a portion of the conveyor circumference, which cover(s) delimit(s) the bale chamber partly. Such covers(s) may be located in the 1st or 4th quadrant, since they are facing the bale forming means. They may be formed as a grid, sheet metal, strippers, or the like. The cover(s) may run under an acute angle to the surface of the bale forming means to facilitate the bale starting.

The feeder/conveyor will operate more sophisticatedly if it can assume further functions, like cutting the goods into pieces or conditioning them. An overload situation can be avoided or a plug or obstruction can be removed, if a moveable wall portion is provided, which can be operated by springs, motors, etc. Depending on the sense of rotation the wall portion may be a bottom or top sheet.

In order to release or prevent stress on the arms, the rolls are mounted moveably on the arms, such that they can follow a given track or guide, where the forces are assumed. Movability can be achieved by a pivoting or a translatory movement of a brace, carrier or the like with the rolls. The contour of the side walls may form the shape of the roll path.

Controlling the density of a bale, speeding up its ejection and giving enough time to start forming a bale core is enhanced by controlling the speed and position of the arms. Such control may happen in a closed or open loop and be influenced by signals received from machine sensors.

Starting bale forming is more efficient, if the bale core is in contact with moving parts, like the tips of carriers on the conveyor, which may protrude through the cover. The extent of the protrusion may vary and can be adjusted by a movement of the cover.

Another conveyor returning lost material to the stream of material/crop to be baled may be provided at various places in the round baler, but especially underneath the bale chamber(s). Such a conveyor may be formed as a band, an auger, a blower, an oscillating pan, etc.

In order to bring and keep the arms into the position needed to create the bale chambers, a transmission is provided, in which drive shafts may be locked in a non-driven state, whereas such lock may be created by a brake, a mechanical positive lock or valves, if drive happens by individual hydraulic motors. The drive shafts may also move, e.g. rotate, if they are connected to an input shaft by a clutch, which may be of any type, of again by a hydraulic or electric motor. As an alternative a planetary gear may be used to drive the shafts and/or all shafts could be in a constant move even if with different speeds.

BRIEF DESCRIPTION OF THE DRAWINGS

The embodiments of the invention are described in detail below with reference to the accompanying drawing figures wherein.

DESCRIPTION OF THE PREFERRED EMBODIMENT

Figure 1:
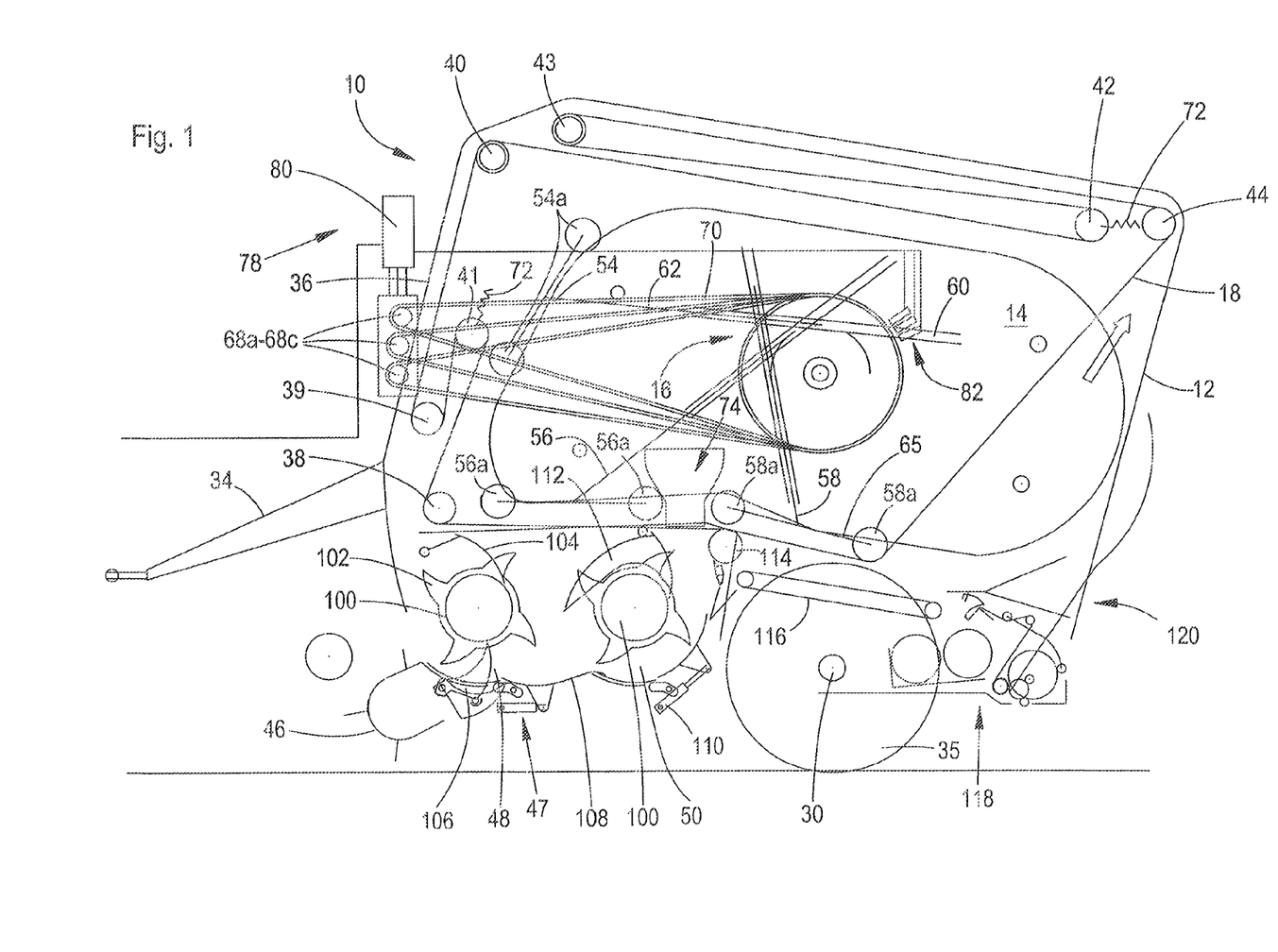
FIG. 1 is side schematic view of an empty round baler.

FIG. 1 shows a round baler 10 with a chassis 12, side walls 14, an arm-and-roller assembly 16 and flexible bale forming means 18.

The round baler 10 is shown as a pull type round baler, to be coupled to a pulling vehicle, like a tractor, but could be part of a self-propelled vehicle as well. Such a round baler 10 is used to produce bales 20, 22 of straw, hay, alfalfa, etc., in a main bale chamber 24 and an auxiliary bale chamber 26, which bales 20 are tied or wrapped before they are ejected and dumped to the ground. This type of a round baler 10 is formed as a so-called non-stop round baler, i.e. the round baler 10 is picking up and baling material and unloading a bale 20, without interrupting the advancement over the field. Other material may be cotton, garbage, fabric, branches of wood, etc., which may be baled, while the round baler 10 is stationary and where a pick-up assembly 46 is fed differently.

The chassis 12 has a frame 28 supported on an axle 30, having a vertical structure 32 and bearing a tongue 34 to connect the round baler 10 to a tractor or the like. The axle 30 is equipped with wheels 35 to support the round baler 10 on the ground, whereas the wheels 35 may be single wheels or wheels on an axle 30 formed as a tandem axle (not shown). The chassis 12/structure 32 may be provided with side shields 36 to cover the functional elements of the round baler 10 for safety reasons.

The structure 32 carries rotatably a lower front roll 38, an upper front roll 40, a moveable roll 42, an upper rear roll 44, a pick-up assembly 46 and a feeder 47 with a front conveyor 48 and a rear conveyor 50.

In a side view the side walls 14 are substantially of a rectangular shape with rounded corner portions. The size and form of the side walls 14 is determined by the maximum size of the bales 20, 22 formed in the auxiliary and main chambers 24, 26. The bottom edge of the side walls 14 follows sort of a saddle roof with an elevated portion in the center and is vertically distant from the top of the front and the rear conveyor 48, 50. According to FIG. 8 the side walls 14 are fixed to the structure 32 in a center area by means of an axle 52. In order to withstand the pressing forces in the bale chambers 24, 26 the side walls 14 are reinforced against bending in a known manner by means of stiffener plates and bars (not shown). In addition abutments 146 are provided, which act between different portions of the side walls 14 and the structure 32 to counteract on the pressure inside the bale chambers 24, 26. Such abutments are moveable to free the path of the arms 54, 56, 58 during their rotation. The axles 52 may be provided with a hydraulic cylinder or the like to move the side walls 14 laterally—over a small distance to decrease the friction between the bales 20, 22 and the side walls 14 during ejection of the bale 20 or over bigger distances like 0.2 m to increase the width of the bale chamber 24, 26 during the bale forming process. The diameter and the cross section of the axle 52 depends on the structure of the arm-and-roller-assembly 16, which is rotating about said axles 52.

The arm-and-roller-assembly 16 comprises a first arm 54, a second arm 56 and a third arm 58, each provided with a pair of parallel rollers 54a, 56a, 58a at their radially outer end area. It further comprises a first drive wheel 54b, a second drive wheel 56b and a third drive wheel 58b assigned and connected to the respective arms 54 to 58, see FIG. 7.

Each arm 54-58 is formed of two parts 60, 62, which are moveable with respect to each other and the relative position between which can be adjusted automatically in that the rolls 54a, 56a and 58a follow the contour of the side walls 14 or a track on this contour or are moved on such or a similar path by means of a non-shown motor, which preferably is a hydraulic motor or alternatively an electric motor. According to FIGS. 1-7 the parts are connected to each other in a telescopic fashion, allowing an extension and retraction of outer part 62 and inner part 60 (or vice versa) in a mere radial direction. In a not shown alternative arrangement both parts 60, 62 are hinged to each other in a joint the pivot axis of which is parallel to the longitudinal axis of the axle 52, whereas the parts 60, 62 are of about the same length. Reference is made to European Patent Document EP 1 264 532. One first, second and third arm 54-58 is provided on each side of the round baler 10 in the space between the side walls 14 and the structure 32. The arms 54-58 of each set are connected among each other through a brace 65 which rotatably receives the respective rolls 54a-58a or which holds a carrier on which these rolls 54a-58a are mounted. Preferably the rolls 54a-58a can assume different positions versus the arms 54-58 to follow the periphery of the side walls 14, but their longitudinal axes are always parallel to axles 52. The inner part 60 of each arm 54-58 is journaled on the axle 52 directly or indirectly for a rotation thereabout. For that purpose each inner part 60 is rigidly connected to one of the drive wheels 54b-58b. According to FIG. 8 all driven wheels 54b to 58b are journaled concentrically, whereas the drive wheel 54b of the first arm 54 is axially outermost and the drive wheel 58b of the third arm 58 is the axially innermost.

Each of the drive wheels 54b-58b is assigned to a drive shaft 68a to 68c, which drive shafts 68a to 68c can be driven independently of each other, by means of a hydraulic or electric motor (not shown) for example, or via a mechanical transmission and clutches as will be described below with respect to FIG. 9. Each drive wheel 54b-58b is also surrounded by a driving means 70 surrounding also drive wheels 69a to 69c, see FIG. 9 on each of the drive shafts 68a to 68c and being engaged with both. If the drive wheels 54b to 58b and the drive wheels 69a to 69c are formed as sprockets, the driving means 70 are chains; if they are formed as sheaves, the driving means 70 are belts. Each drive wheel 54b-58b is operated such, that it can bring the respective arm 54-58 into a certain position and keep it in said position until a change is necessary. As it becomes apparent from FIGS. 1 to 7 the arms 54-58 while remaining in the same sequence rotate about axles 52 during one full baling cycle, whereas the distance between and the operational length of the individual arms 54-58 changes through the cycle. In order to avoid a bending and/or torsion of the arm-and-roll-assembly 16 comprising the respective arms 54-58 and the braces 65 a respective drive wheel 54b-58b is provided preferably on both sides of the round baler 10. Control of drive shafts 68a to 68c will be described in more detail further below.

The flexible bale forming means 18 is formed in this embodiment by multiple belts arranged side by side and starting with the lower front roll 38 are trained over the front roll 38, two idler rolls 39 and 41, upper front roll 40, moveable roll 42, an idler roll 43 close to the upper front roll 40, upper rear roll 44 and finally rolls 58a, 56a and 54a. Alternatively a chain-and-slat-assembly could be used instead as well as a belt extending over the full span between the side walls 14. The flexible bale forming means 18 are well known and fixed in length and width, although they may lengthen slightly under the tension applied. In case of several bale forming means 18 their number corresponds to the distance between the side walls 14 and can be varied if the distance is changed. The bias in the bale forming means 18 is maintained by means of a force applied by a spring 72 or the like on the moveable roll 42 and/or on one of the idler rolls 39, 41. The moveable roll 42 or idler rolls 39 or 41 may be carried on a pivotable arm (not shown) or in a sliding carriage (not shown) against the bias of the spring 72. At least one of the rolls 38, 39, 40, 41, 42, 44, 58a, 56a, 54a is driven and preferably it is one of the stationary rolls 38, 40, 44, whereas rubber sleeves of smaller width and with grooves may be used between the rolls 38, 40, 44 and the bale forming means 18 to increase the drive friction.

Having two rolls 54a, 56a, 58a on each arm 54, 56, 58 provides for a better routing of the flexible bale forming means 18 and the ability to create a bigger distance between the bale chambers 24, 26. It would be possible to have three rolls 54a, 56a, 58a on each arm offset to each other to create some friction and thus tension in the bale forming means 18. Depending on the travel direction of the flexible bale forming means 18, such friction may increase the tension in the bale forming means 18 downstream of it and decrease the friction upstream of it. This enables the reduction of the tension in the bale forming means 18 in the auxiliary bale chamber 26, which assists in starting a bale, and to increase the tension of the bale forming means 18 in the main bale chamber 28, which provides for a higher density of the final bale 20. The friction may be adjusted by means of motors, screws, etc. The direction of the bale forming means is as shown by the arrow in FIG. 1.

Figure 5:
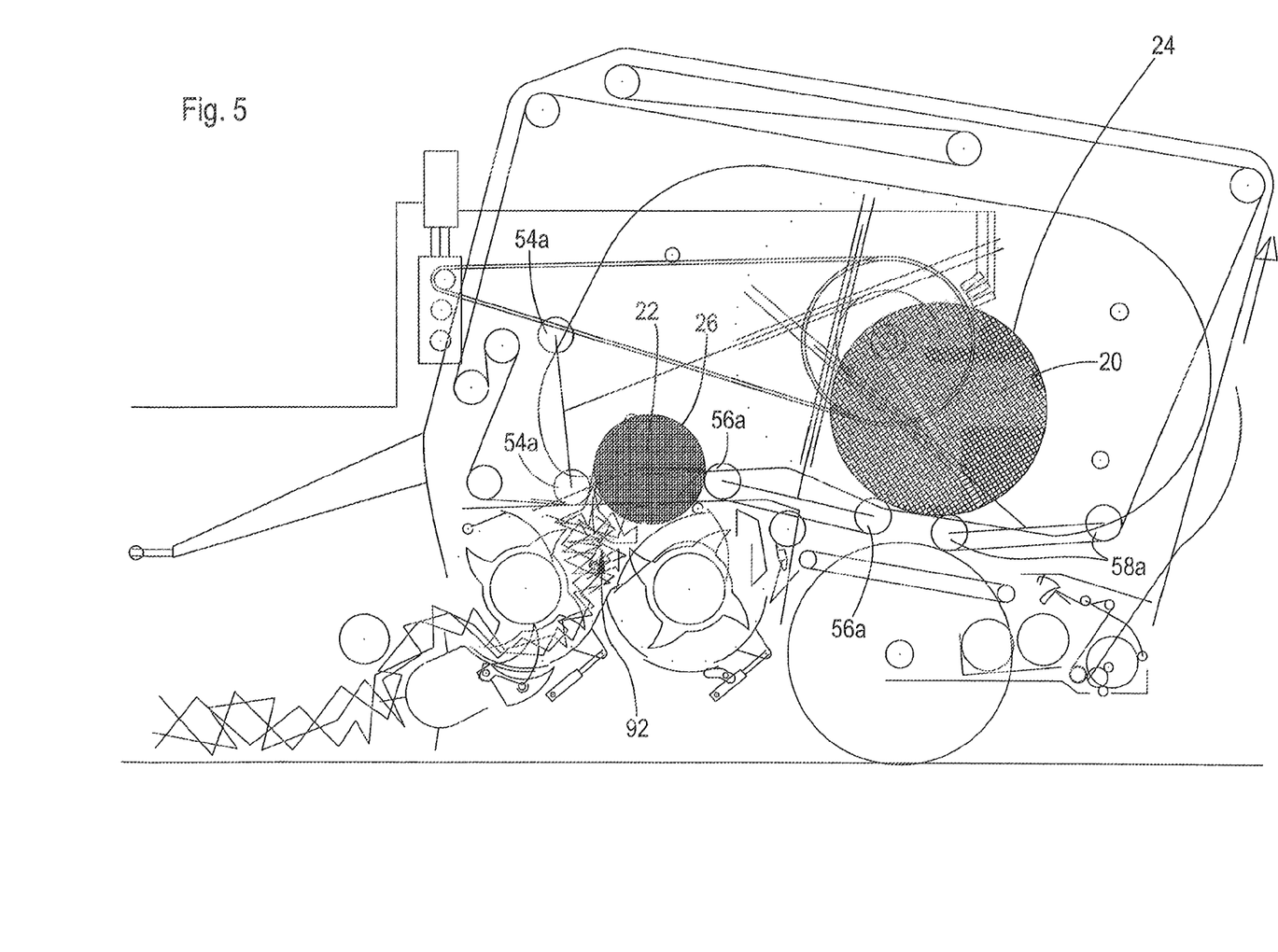
FIG. 5 is the round baler of FIG. 4 with a further grown auxiliary bale.
Figure 6:
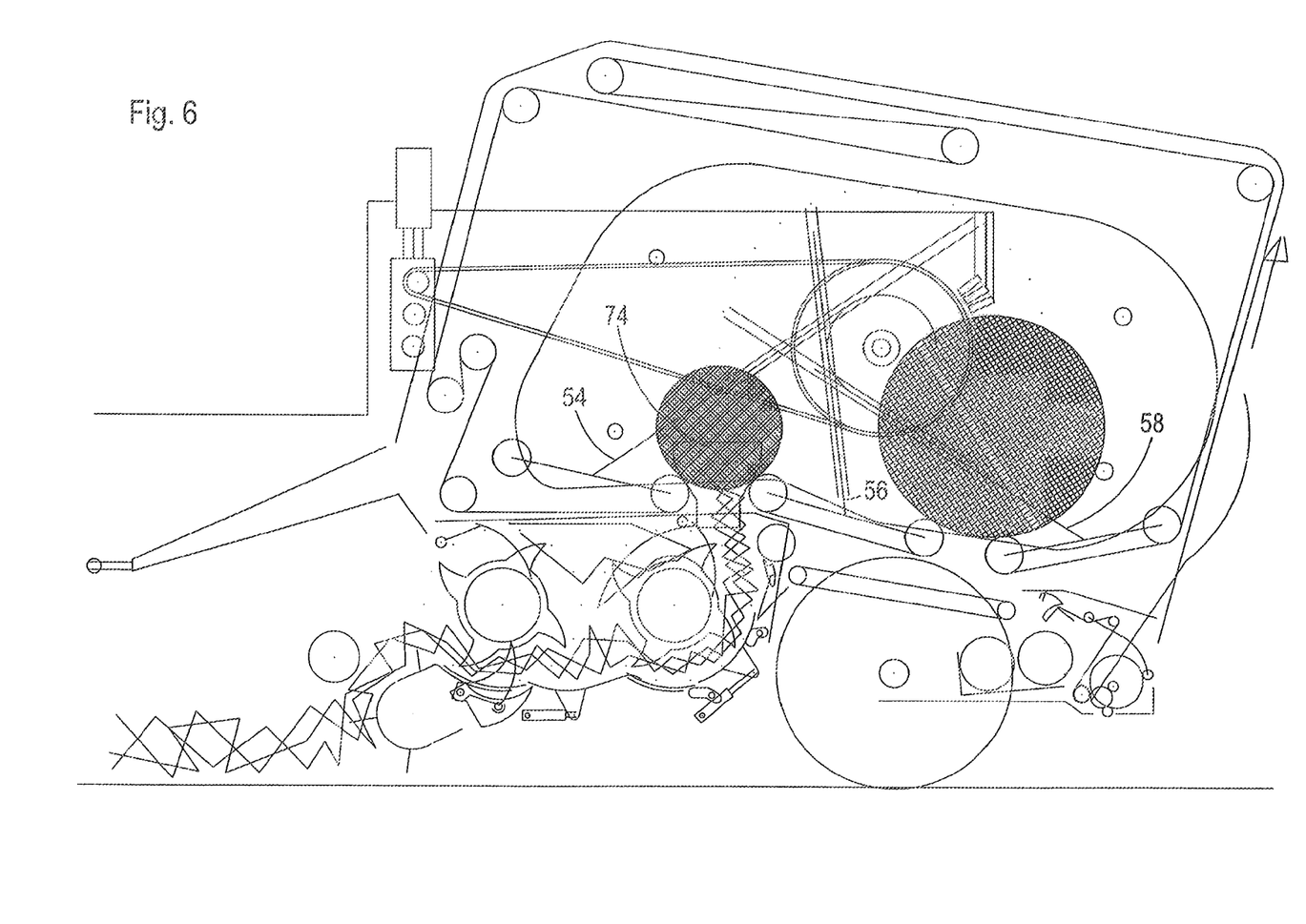
FIG. 6 is the round baler with a completed bale ready for wrapping in the main bale chamber and with an auxiliary bale in the auxiliary bale chamber fed by a rear feeder.
Figure 7:
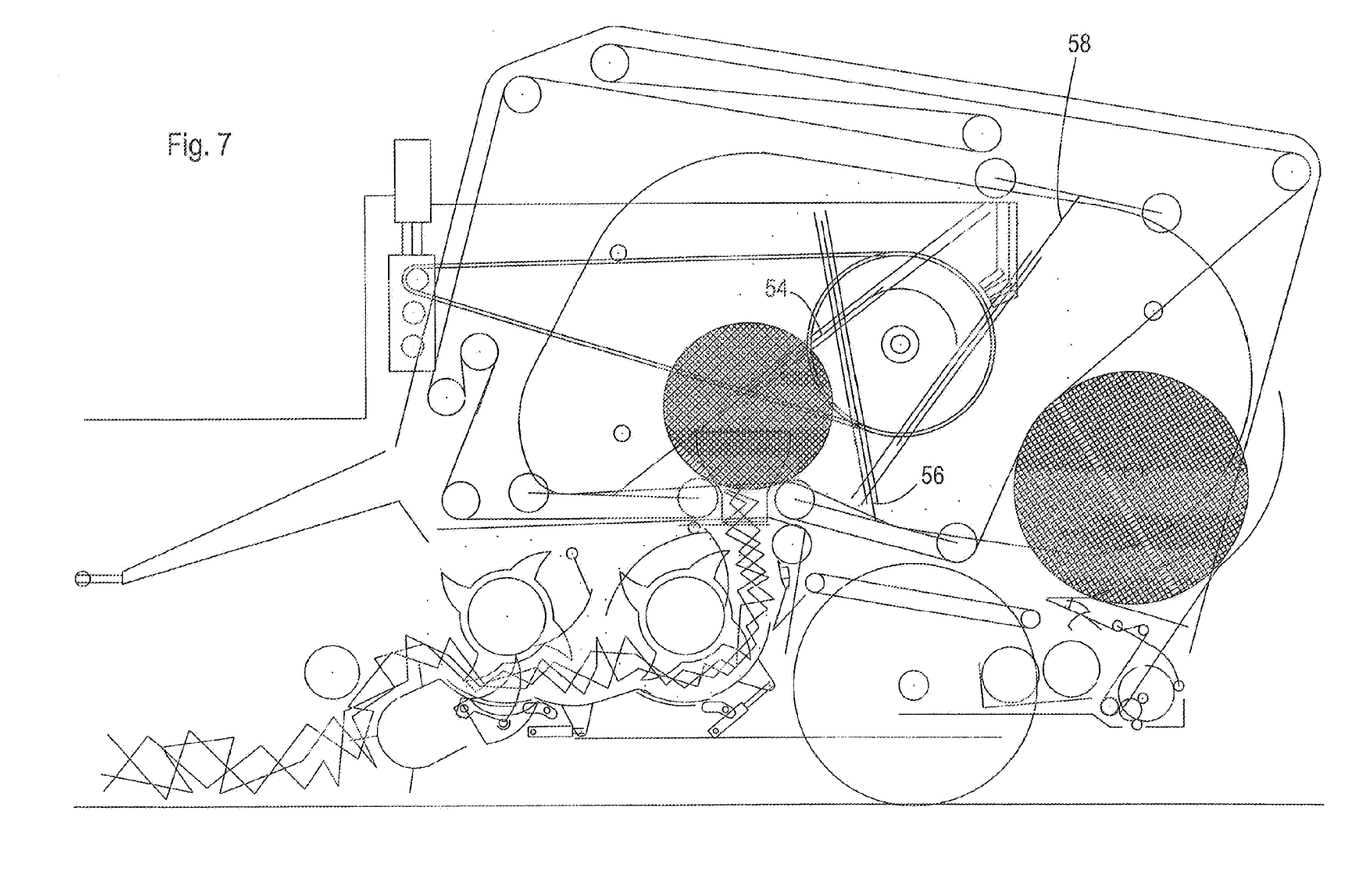
FIG. 7 is the round baler of FIG. 6, whereas the main bale is ready for ejection.

As can best be seen in FIGS. 5 through 7, the arm-and-roller-assembly 16 enables the formation of a main bale chamber 24 and an auxiliary bale chamber 22, whereas the main bale chamber 24 is the rear one, in which the bale 20 is completed. The main bale chamber 24 is substantially enclosed by a loop of the flexible bale forming means 18 formed between the adjacent rolls 58a and 56a of the third and the second arm 58, 56 while the auxiliary bale chamber 26 is substantially enclosed by a loop of the flexible bale forming means 18 formed between the adjacent rolls 56a and 54a of the second and the first arm 56, 54. Since arms 54-58 are rotating counterclockwise when viewing FIGS. 1-7 during the formation of a bale 20, 22, the description so far referred to a situation as shown in FIGS. 1-7; in a subsequent bale forming cycle the auxiliary bale 22 would be formed in a loop created between rolls 54a, 58a of arms 54 and 58, since the entire set of arms 54-58 will be offset by one arm per cycle. The size of said loops depends on the position of the arms 54 to 58, whereas within limits the size of each single loop can be varied by adjusting the position and the length of the involved arms 54, 56 or 56, 58. It is visible from FIG. 6 that the loops stay within the periphery of the side walls 14 but could assume a size up to it; see dashed lines. As it is apparent from the sequence given in the order of FIGS. 2-7 each auxiliary bale chamber 26 turns into a main bale chamber 24 as soon as it is moved far enough to the rear, so that a second loop may be formed above the front or rear conveyor 48, 50.

The pick-up assembly 46 is of a conventional design with elastic tines rotating in vertical planes to lift crop from the ground and deliver it rearward into the front conveyor 48. The pick-up assembly 46 may be wider than the distance between the side walls 14 and have converging augers to deliver said crop towards a center area, as it is known in the prior art and thus not shown.

The front conveyor 48 is located between the pick-up assembly 46 and the rear conveyor 50. It is located underneath the front portion of the side walls 14.

The rear conveyor 50 follows immediately upon the front conveyor 48.

Both conveyors 48, 50 are of the rotary feeder type and have a rotor 100 each, whereas their axes run parallel to each other and horizontally transverse to the flow of crop. Each rotor 100 is circumferentially provided with radially extending carriers 102, which interact with guides 104, usually called strippers as are well known. The front conveyor 48—and if need be also the rear conveyor 50—is provided with a cutting unit 106 cooperating with the carriers 102 in order to cut the incoming crop into short pieces. Such cutting unit 106 is of the widely known type and may be made non-operational to leave the crop uncut, may be provided with an overload mechanism, and may change the number of active knives etc. Each conveyor 48, 50 has an outlet 92 (front), 94 (rear) with a moveable wall portion 108, which wall portion 108 is attached to the chassis 12 in any of the known kinds, i.e. merely pivotable, pivotable against the force of a spring, moveable in a track, etc. In the embodiment shown the wall portion 108 is pivoted by means of a motor 110, which at one side is held by the chassis 12 or the pick-up assembly 46 and at the other side connects to the wall portion 108. Finally a cover 112 is provided in and extending over the 4th quadrant of the rear conveyor 50, the purpose of which becomes evident when looking at FIGS. 3-5. The cover 112 is provided with slots (not shown) through which the tips of the carriers 102 reach. According to FIG. 3 and as it will be described in more detail later, a core of a bale 22 is formed in a cavity between the front and rear conveyor 48, 50 and the bale forming means 18, whereas in this situation the rear conveyor 50 shall not move the core out of contact with the front conveyor 48, but keep it rotating by means of the tips of the carriers 102. The cavity is the beginning of the auxiliary bale chamber 26. Both rotors 100 are arranged such, that the circles of the tips of their carriers 102 come pretty close to each other.

Figure 8:
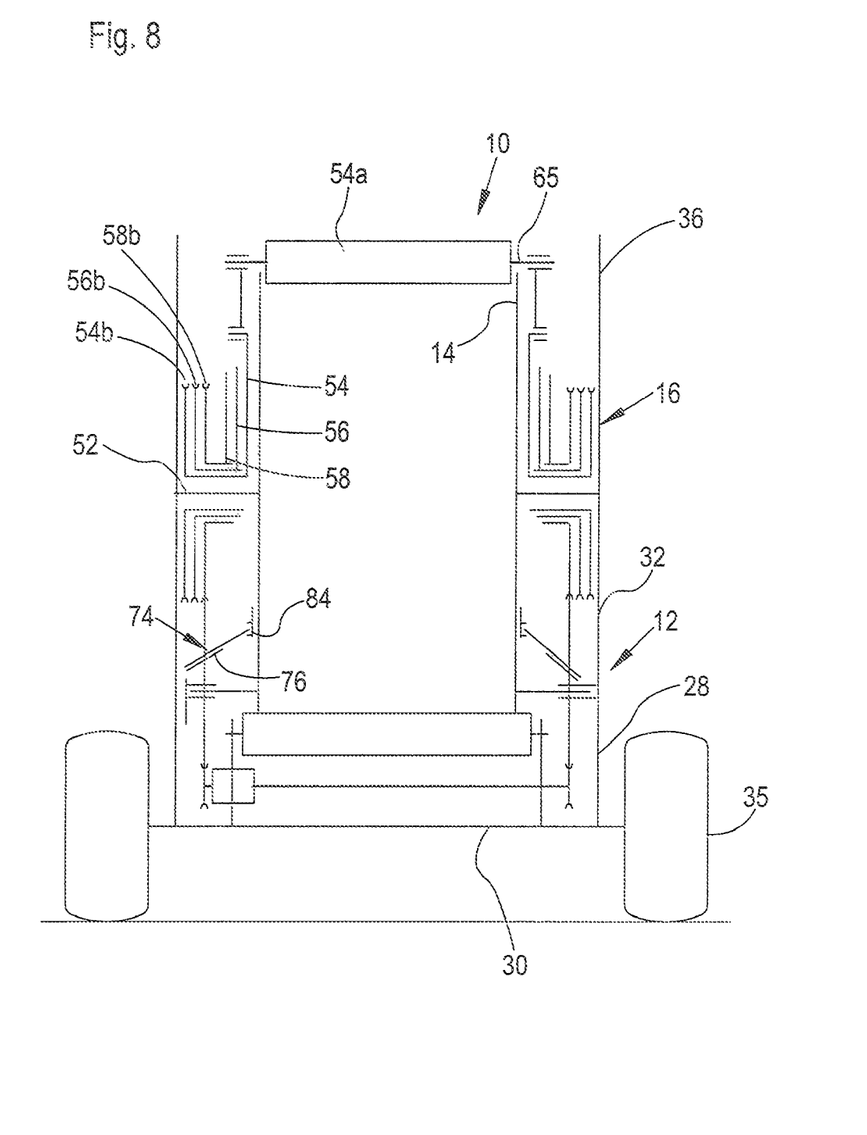
FIG. 8 is the round baler in a rear view.

As can be seen in FIG. 8 a filler plate assembly 74 is provided on each side of the round baler 10 between the lower edge of the side walls 14 and the front and the rear conveyor 48, 50 to avoid crop, like leafs or brittle straw to escape from the respective bale chamber 24, 26 through this gap or on the path between the conveyors 48, 50 and the bale chambers 24, 26. Each filler plate assembly 74 comprises filler plates 76 at various locations, and is moveable between a position closing said gap and a position in which it is moved out of the path of the respective rolls 54a, 56a, 58a. Movement may be achieved either through slanted surfaces at the leading end, so that the approaching roll 54a, 56a, 58a moves the filler plate 76 away, or it may be achieved by an actuator like a motor, a linkage or the like, moving the filler plate 76 in a track or about an axis. Each filler plate 76 may consist of several portions which are moved subsequently away from the gap depending on the position of the respective roll 54a, 56a, 58a. Portions of the filler plate 76 may be moved in a cycle along the side walls 14 in order to cover always the gap between the conveyors 48, 50 and the side walls 14. For this purpose one set of portions of the filler plate 76 may be attached to the side wall 14 about a horizontal axis 84 to pivot away, when another portion moves along the side walls 14.

The position and—if not controlled mechanically by tracks or the like—also the length of the arms 54-58 is controlled by means of a control circuit 78 having a controller 80 and sensors 82 and acting on the drive wheels 54b, 56b, 58b and any motors used in the round baler 10.

The controller 80 is preferably in the form of a software operated computer located on the round baler 10 or on the pulling vehicle and produces output signals according to a given program.

The sensors 82 may be provided to measure the position and if needed the radial extension of each arm 54-58. Other values may be gathered as well, like the condition and amount of the crop or any kind of goods, the position of the moveable roll 42 or one of the idler rolls 39, 41, the position of the round baler 10 on the field, the status of the tying or wrapping cycle, the diameter of the bales 20, 22 on each side, etc.

The round baler 10 is furthermore provided with a deflector assembly 114, a conveyor 116, a wrapping apparatus 118 and an unloading mechanism 120.

The deflector assembly 114 contains a normally counter-clockwise driven roll and a scraper to avoid wrapping of crop around the roll. The deflector assembly 114 is located at the outlet of the rear conveyor 50 and in the path to the auxiliary bale chamber 26. The deflector assembly 114 extends in parallel to the rotor 100.

The conveyor 116 is formed as a closed band routed around two rolls, of which at least one is driven such, that the upper run of the band moves towards the rear conveyor 50. The upper surface of the conveyor 116 extends more or less parallel to the lower edge of the side walls 14 and is oriented horizontally or slightly inclined from the rear to the front. The conveyor 116 has a distance to the path of the rolls 54a, 56a, 58a, which is sufficient to carry small crop without any interference. It is the purpose of the conveyor 116 to catch brittle crop leaving the main bale chamber 24 and return it to the rear conveyor 50. For that purpose wall portion 108 leaves a gap towards deflector assembly 114.

The wrapping apparatus 118 is provided to feed net and/or plastic (not shown) into the area between the flexible bale forming means 18 and the main bale 20 in the main bale chamber 24, when the main bale 20 is completed. As is known from wrapping apparatuses in the art, such a wrapping apparatus 118 comprises one or more rolls of wrapping material in a housing, a feeding mechanism, like a so-called duckbill, a braking device and a cutting device. The wrapping apparatus 118 is located in the rear lower area of the round baler 10 behind the conveyor 118 and underneath the rear portion of the sidewalls 14.

The unloading mechanism 120 has a ramp 122 pivoting about a horizontal transverse axis 124, whereas the position of the ramp 122 is controlled by the weight of an unloaded bale 20 acting against a spring force, or by motors—none of them being shown. The ramp 122 will be in a lower position, in which its rear end touches or almost touches the ground in order to let a bale 20 roll out of the main bale chamber 26, and it will be in a raised position during the formation of a bale 20.

While it is not shown in the drawing, a tying mechanism for twine may be provided at the open side of the main bale chamber 24.

The output signals generated by the controller 80 among others provide for a movement of the arms 54-58 and their parts 60, 62 such, that the rollers 54a-58a at their end follow the sequence given in FIGS. 1-7. This sequence is the following:

Empty Bale Chambers—FIG. 1:

First arm 54 is in a front medium high position and second and third arms 56, 58 are in a lower position. Bale forming means 18 extend over their rolls 54a to 58a to form sort of a rectangle in which a front section extends above and close to the upper surface of the front and rear conveyor 48, 50. In this stage at least the moveable roll 42 is in an rightmost position in FIG. 1 and the spring 72 is under little bias. The bale forming means 18 do not provide a loop between the rolls 56a, 58a of the second and the third arm 56, 58 but a substantially straight span, which is deflected upwardly by deflector assembly 114.

Figure 2:
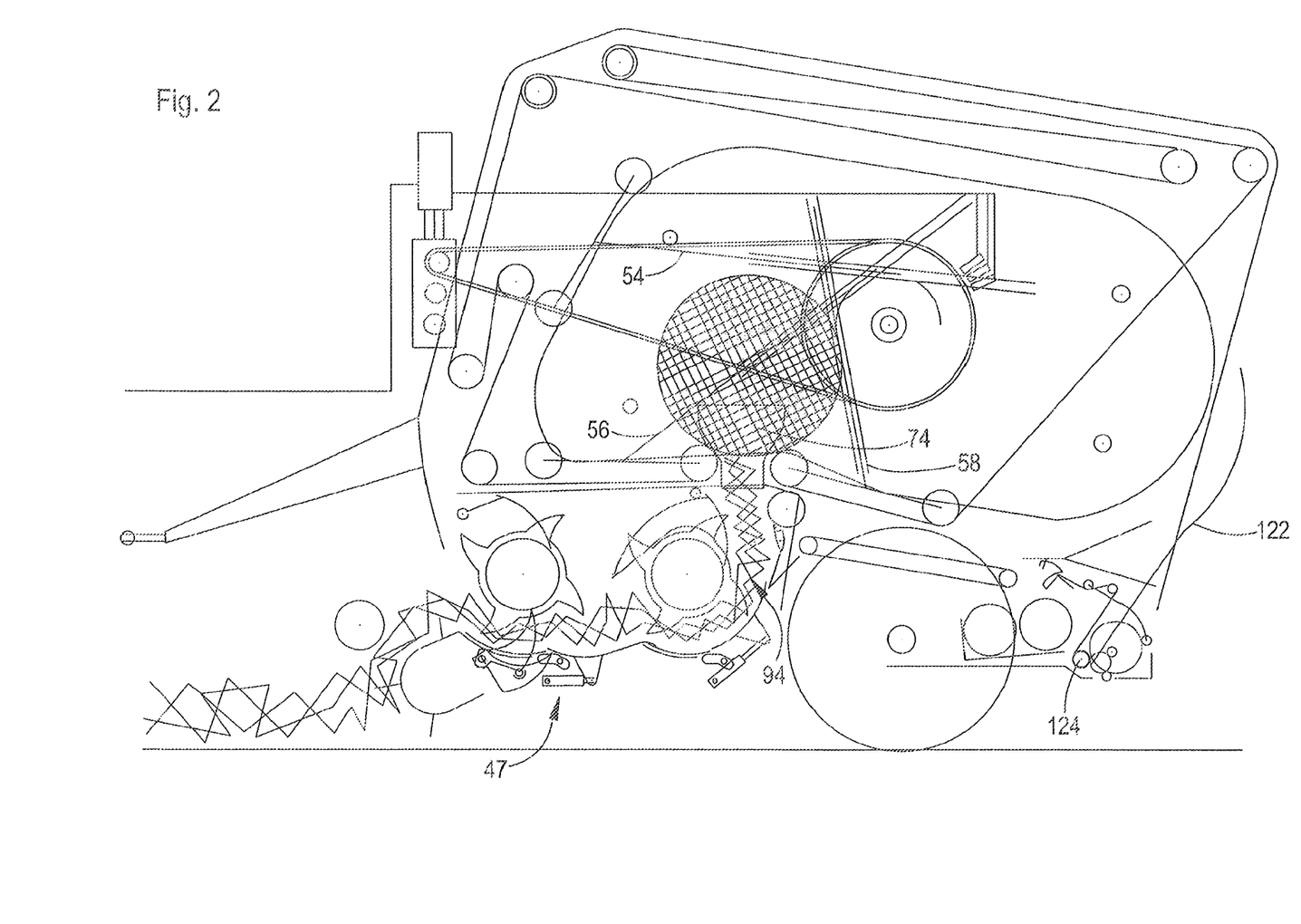
FIG. 2 is the round baler of FIG. 1 with a partially filled auxiliary bale chamber and some drive means.

Auxiliary Bale Chamber Gets Filled—FIG. 2:

Crop is collected by the pick-up assembly 46 and fed rearward to the front conveyor 48, where it is cut into short pieces, if the cutting unit 106 is in its operational position, otherwise it is forwarded undershot by the rotor 100. Wall portion 108 of the front conveyor 48 is pivoted downwardly to provide a passage to the rear conveyor 50, acting undershot as well. Wall portion 108 of the rear conveyor 50 is in its upward position and extends from wall portion 108 of the front conveyor 48 to the deflector assembly 114. Crop is guided upward through outlet 94 towards the bale forming means 18, thereby passing the deflector assembly 114. The crop will hit the bale forming means 18 at the span bridging the distance between the rear roll 56a of the second arm 56 and the front roll 58a of the third arm 58 to create a small loop in which crop is accumulated and formed to a cylindrical bale 22. Feeding crop will continue until the still auxiliary bale 22 has reached the wanted diameter, which may be as big as the distance between the lower and the upper edge of the side walls 14, as this is shown in dashed lines in FIG. 2. Once a completed bale 20 is formed, the next auxiliary bale 22 is not started from the outlet 94 of the rear conveyor 50, but from the outlet 92 of the front conveyor 48, as this will be described with respect to FIG. 3.

Figure 3:
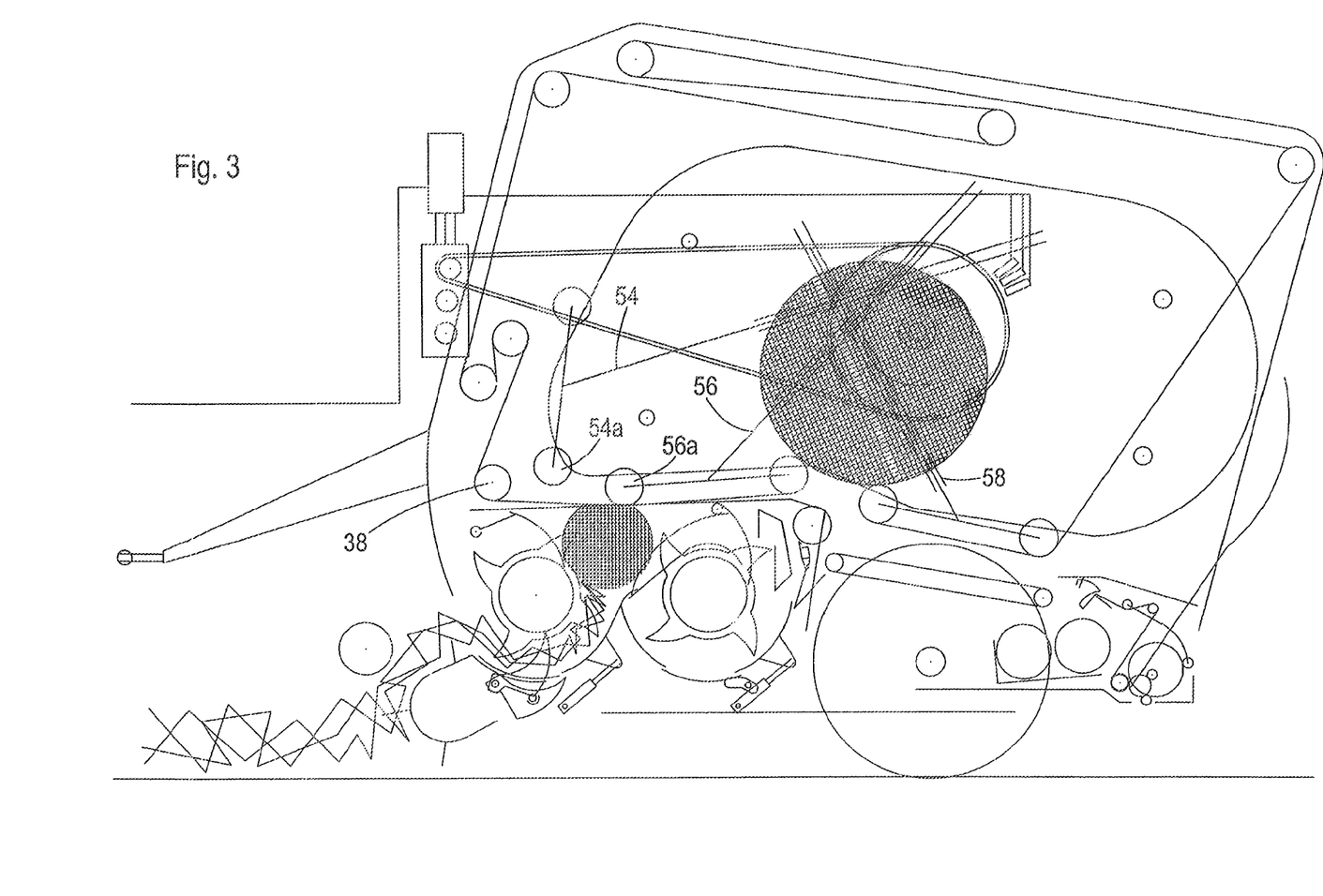
FIG. 3 is the round baler of FIG. 1 with an almost full auxiliary bale chamber in the transition to a main bale chamber and with an auxiliary bale in its start phase.
Figure 4:
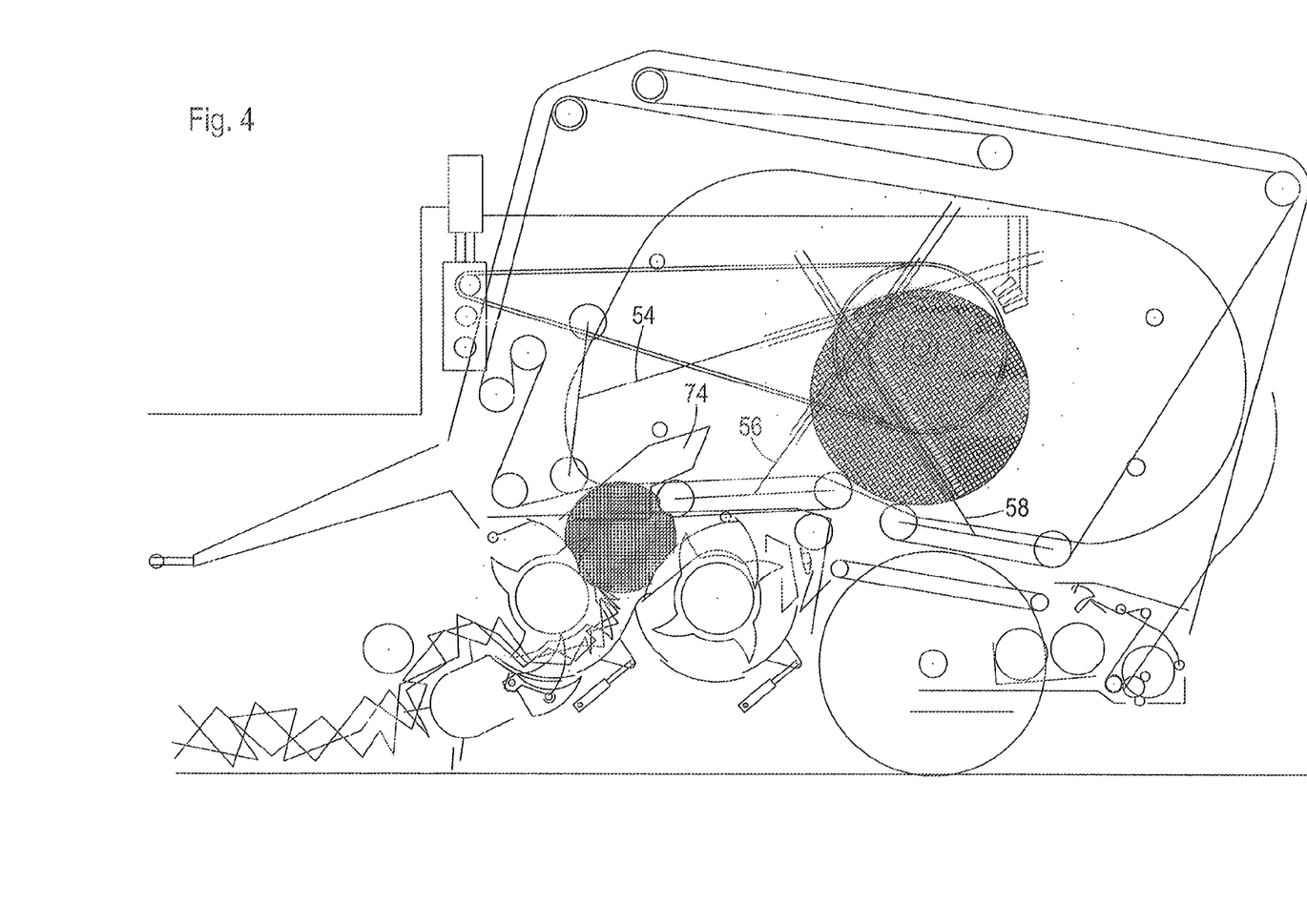
FIG. 4 is the round baler of FIG. 3 with a grown auxiliary bale in the auxiliary bale chamber and a complete bale in the main bale chamber now moved to the rear of the round baler.

Start of the Transition Stage from the Auxiliary Bale Chamber 26 to the Main Bale Chamber 24—FIG. 3:

All arms 54-58 are moved counter-clockwise as seen in FIGS. 1-7. Thus the rolls 54a of the first arm 54 come close to the front conveyor 48. Wall portion 108 of the front conveyor 48 will be pivoted upwardly to close the passage to the rear conveyor 50. In its upper position the wall portion 108 will contact cover 112 of the rear conveyor 50 and thus avoid any entry into the rotor 100 of the rear conveyor 50. A space will be provided, which is limited to the front by the guides 104 and the rotor 100 of the front conveyor 48, to the rear by the cover 112 and to the top by a span of the bale forming means 18 above front outlet 92. This span, which is deflected upwardly to create a loop for an auxiliary bale 22 to be formed, extends between lower front roll 38 and subsequently rear roll 54a of the first arm 54 on one side and by the front roll 56a of the second arm 56 on the other side. While this auxiliary bale 22 is growing, second and third arm 56 and 58 are moving to the back to increase the distance between the adjacent rolls 54a, 56a of the first and the second arm 54, 56. During this and other movements the outer arm parts 62 move in the inner arm parts 60 to follow the contour of the side walls 14 or of the assigned tracks. The main bale 20 rides on the rear roll 56a of second arm 56 and on the front roll 58a of the third arm 58 and moves on and with them to the back.

The following description refers to the situation shown in FIGS. 5 and 6. In a stage, in which the auxiliary bale 22 has reached a certain size, it will be moved further to the rear and in order to feed more crop into the auxiliary bale chamber 26 crop is guided from the front conveyor 48 to the rear conveyor 50 and from the rear conveyor 50 upward through the rear outlet 94 to the auxiliary bale chamber 26. In order to improve the flow of material, the guides 104 of the front conveyor 48 are pivoted downwards to avoid that material is rotating with the front rotor 100 passed the rotor 100 of the rear conveyor. While this happens, the main bale 20 is wrapped or tied in the main bale chamber 24.

In the situation of FIG. 7 the bale gets wrapped by means of the wrapping apparatus 118 and unloaded via ramp 122, which is pushed down (not shown) by the weight of the bale, after third arm 58 is raised above the main bale 20 to open the main bale chamber 24.

Figure 9:
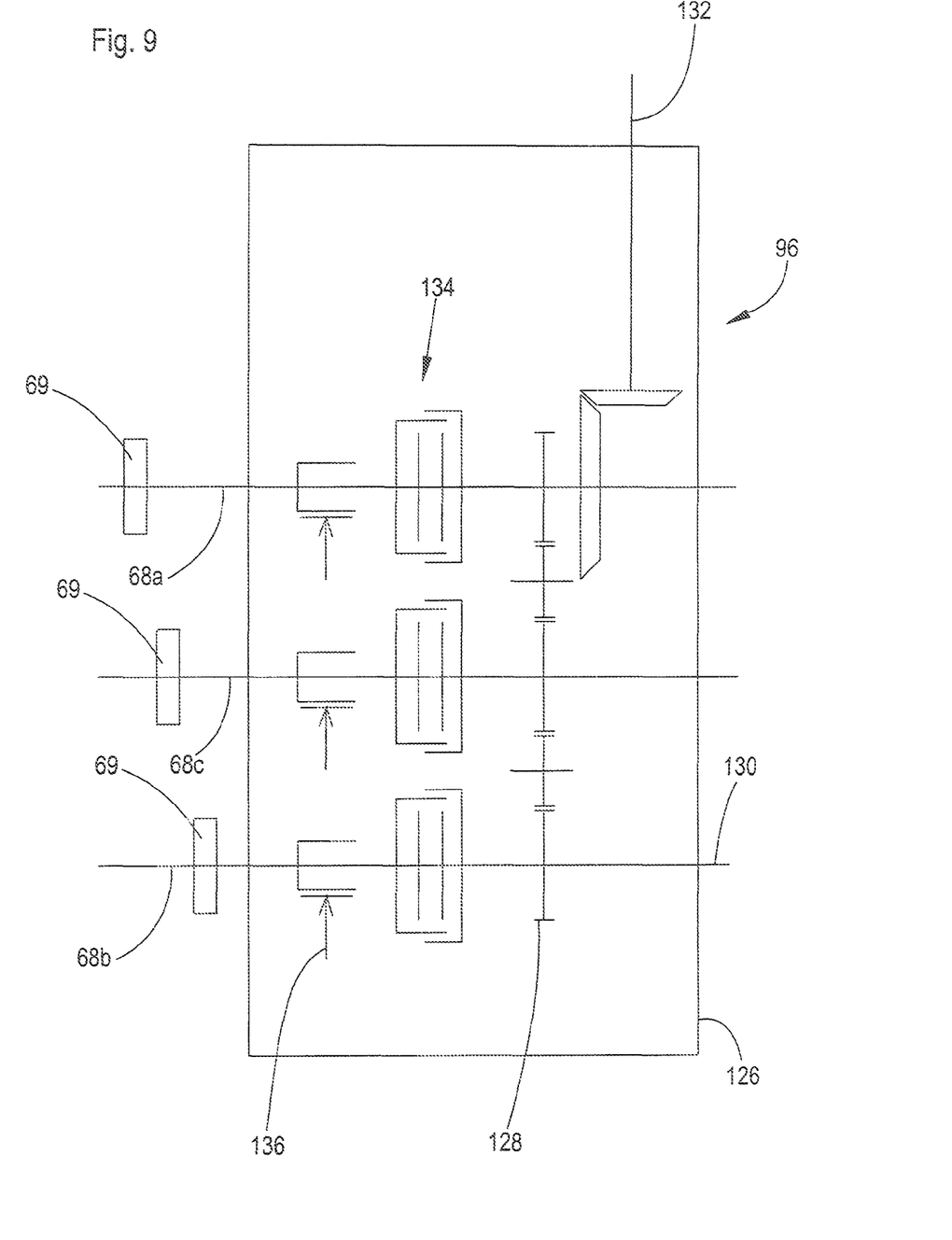
FIG. 9 is a drive line concept of the round baler.

FIG. 9 shows a transmission 96 with a drive line concept for driving drive shafts 68a to 68c. In this concept at least three parallel drive lines are provided in a gear box 126, whereas all drivelines are driven via a spur gear transmission 128 such, that per drive line one input shaft 130 is driven constantly from a main input shaft 132, which itself is driven by the pulling vehicle and is connected via a bevel gear. Each input shaft 130 is connected to a clutch 134, which may be a hydraulically or electrically operated disc, multiple disc or band clutch. On the output side of the clutch 134 is provided a drive shaft 68a to 68c, to which is assigned a brake 136, which again may be of the disk or band type and which also is activated/deactivated and closed/opened hydraulically or electrically. A non-shown control assures, that in each drive line clutch 134 is closed, when brake 136 is open or vice versa. Accordingly shafts 68a to 68c will either be driven or locked against rotation to keep the respective arm 54, 56, 58 in its respective position. Instead of main input shaft 132 and a spur gear transmission 128 a non-shown hydraulic or electric motor could be used per input shaft 130. In this case—depending on the used hydraulic or electric circuit—no clutch 134 and brake 136 may be required. Furthermore, the speed to move arms 54, 56, 58 may be adjusted to the given operation mode of the arms, e.g. an arm 54, 56, 58 moving to unload a finished bale may be moved faster than an arm controlling the growth of an auxiliary bale 22. Alternatively one or more planetary gears may be used to drive input shafts 130 or drive shafts 68a to 68c, which either of its elements. Depending on the baling process all arms 54, 56, 58 could be kept rotating all the time, although—if need be—at different speeds.

Whenever the rolls 54a-58a are moved through the gap between the lower edge of the side walls 14 and the top surface of the feeder 47 the filler plates 76 are moved away to free the track.

Having described the preferred embodiment, it will become apparent that various modifications can be made without departing from the scope of the invention as defined in the accompanying claims.

The invention claimed is:

1. A round baler comprising:
   three or more arms;
   an endless bale forming means routed over at least one roll on each of the three or more arms, the rolls of adjacent ones of the arms leave a distance between one another bridged by a span of said bale forming means;
   a feeder pressing a material to be baled against said span of said bale forming means and selectively delivering the material at various outlet locations; and
   a transmission having one drive shaft for each of the arms, wherein each of the drive shafts assumes a condition in which it is one of connected to an input shaft and disconnected from the input shaft and locked against motion.

2. A round baler according to claim 1, wherein the feeder has multiple interconnected outlets.

3. A round baler according to claim 1, wherein a conveyor is provided to return lost material to a stream of crop to be baled.

4. A round baler according to claim 1, wherein the feeder has multiple conveyors, each being connected to a separate outlet, and wherein at least one of the conveyors is provided with at least one of a cutting unit and a moveable wall portion.

5. A round baler according to claim 4, wherein at least one of the conveyors has a cover for a portion of its circumference, wherein said cover acts at least temporarily as part of an initial auxiliary bale chamber.

6. A round baler according to claim 5, wherein the conveyors contain rotors, which partially extend through the covers.

7. A round baler according to claim 1, wherein the rolls at the end of the arms are retained by a brace, which moves with respect to the arm to follow one of a track and contour of one or more side walls covering the bale chambers laterally.

8. A round baler according to claim 1, wherein the arms are be driven independently of each other.

* * * * *